United States Patent

[11] 3,603,544

| [72] | Inventor | Richard W. Griffith |
| | | Green Ridge, Pa. |
| [21] | Appl. No. | 648,920 |
| [22] | Filed | June 26, 1967 |
| [45] | Patented | Sept. 7, 1971 |
| [73] | Assignee | Sun Shipbuilding & Dry Dock Company |
| | | Chester, Pa. |

[54] TRAILER SUPPORT DEVICE
2 Claims, 13 Drawing Figs.

[52] U.S. Cl. .................................................. 248/119 S,
248/361, 105/368
[51] Int. Cl. ...................................................... B60p 7/00
[50] Field of Search ........................................... 248/119,
119 S, 361; 105/368 S, 369 A; 280/434

[56] References Cited
UNITED STATES PATENTS

| Re. 14,006 | 11/1915 | Praeger | 248/361 |
| 2,031,256 | 2/1936 | Dorsey, Jr. | 105/368 (S) |
| 2,610,069 | 9/1952 | Ketel | 280/434 |
| 2,637,453 | 5/1953 | Cleveland | 248/119 X (S) |
| 3,250,506 | 5/1966 | Thouvenelle et al. | 248/119 (S) |
| 3,392,944 | 7/1968 | Wyrough | 248/119 (S) |

Primary Examiner—Francis K. Zugel
Attorney—Donald R. Johnson

ABSTRACT: A rigid boxlike structure provides a stand or support for trailers during transport thereof on ships or railway cars. The support has a kingpin which can engage the "fifth wheel" of a tractor, and also has a "fifth wheel" which can engage the kingpin of a trailer. The support can thus be used to couple a tractor to a trailer and, when released from the tractor, can support the front end of the trailer on a ship's deck. The support carries a latching member which is engageable with a fixed latching abutment provided on the deck to secure the support and hence the trailer in position during the voyage.

PATENTED SEP 7 1971

INVENTOR:
RICHARD W. GRIFFITH

BY Donald R. Johnson
ATTY.

INVENTOR:
RICHARD W. GRIFFITH
BY
Donald R. Johnson
ATTY.

TRAILER SUPPORT DEVICE

This invention relates to a securing support device for truck trailers, and more particularly to a device for supporting and securing the forward ends of such trailers during transport thereof on carrying vehicles such as ships.

As is well known by those skilled in the art to which this invention relates, transportation of manufactured goods has become almost exclusively the province of truck trailers. In order to properly take advantage of other means of bulk transport such as railway cars and ships, it has become standard practice to "piggyback" truck trailers on railway flat cars or "fishyback" truck trailers on ships. The trailers are loaded on the auxiliary vehicle, carried close to their ultimate destinations by bulk transport such as a railway train or a ship, and thereafter are unloaded and separately driven to their ultimate destinations.

It has been found that the conventional "landing gear" of a trailer does not provide an adequate support for the forward end of the trailer during transport of the same on auxiliary vehicles as previously described. The "landing gear" of a trailer is relatively weak and the jolting of the auxiliary vehicle causes the landing gear, in many cases, to collapse; this results in the accrual of a large number of claims for damaged goods.

The support device of this invention provides a rigid and strong yet rather inexpensive construction. It is simple, foolproof, and easily operated and manipulated.

The support device of this invention may be quickly and easily attached to a tractor and to the forward end of a trailer. The support and trailer combination can then be hauled by the tractor to the position that the trailer is to assume on the auxiliary or carrying vehicle. By means of a latching member carried by the device, the device may be quickly and easily secured to a fixed abutment provided on the auxiliary vehicle at this position. The tractor can then be removed and the support left in position during the journey (voyage). The support device acts to support the forward end of the trailer and to prevent untoward movement of such trailer, thus protecting the goods within the trailer from damage. When the carrying vehicle reaches the end of its journey, the latching member can be released from the abutment, and then the support-trailer combination can be hauled off the auxiliary vehicle; thereafter, the support can be quickly and easily removed from the trailer and the trailer hauled to its ultimate destination by a suitable tractor, for example an "over-the-road" tractor.

The foregoing constitutes a brief description of the device of the present invention and some of the advantages thereof.

A detailed description of the invention follows, taken in conjunction with the accompanying drawings, wherein.

The support device 1 of this invention, which is formed from a suitable rigid material such as steel plate, has a generally boxlike configuration with a top wall 2, a bottom wall 3 substantially parallel thereto, and a pair of spaced, parallel upstanding sidewalls 4 and 5 interconnecting the top and bottom walls, near respective opposite edges of the top and bottom walls. The "box" thus formed has four walls, and is open at its front and rear ends. The top wall 2 is mostly planar, but a small portion of this wall near the rear edge thereof is bent downwardly along an arc as at 2a, to facilitate passage of this edge of the top wall beneath a trailer. The inner end of the bent portion is indicated at 6 in FIG. 2, this end extending across the entire width of the top wall 2, less the portion of this wall cut out by an opening now to be described.

At first inwardly tapering opening 7 is provided in top wall 2, this opening extending inwardly from the center of the rear edge of this wall. Opening 7 is symmetrical with respect to a horizontally extending centerline in FIG. 2. Opening 7 extends from the rear edge of top wall 2 to a second opening 8, which extends inwardly from first opening 7. Opening 8 has an arcuate inner face, and is adapted to allow entry thereinto of the kingpin of a trailer, as will be subsequently explained.

Two spaced, parallel longitudinally extending angle members 9 and 10 are welded to the underside of top wall 2, these angle members extending from the front edge to the rear edge of this top wall. The angle members 9 and 10 extend parallel to sidewalls 4 and 5, angle member 9 being spaced inwardly from sidewall 4 and angle member 10 being spaced inwardly from sidewall 5. The rear end portion of each of the members 9 and 10 is cut away at its upper edge along an arc, to conform to the arcuately bent portion 2a of the top wall. At the front end of each of the members 9 and 10, a portion of the web is cut out and then the flange is bent upwardly and welded, to provide in effect a beveled lower surface such as 9a (FIG. 1) on the front end of each of these members. This beveled lower surface facilitates passage of a tractor frame below the members 9 and 10, from the front of device 1.

An aperture 11 is provided in the web of member 9, intermediate the ends thereof, for a purpose to be hereinafter described.

The upper end of a device transporting pin member (kingpin) 12 is welded to the lower face of top wall 2, opposite the opening 8 and spaced forwardly therefrom, so that pin 12 downwardly depends from the lower face of this top wall. It is here noted that the term "opposite," in this context, means that the longitudinal axis of pin 12 and the center of curvature of the arcuate portion of opening 8 lie in a common substantially vertical longitudinal plane. That is to say, pin 12 is forward of opening 8 and in alignment therewith. Pin 12 is similar to the kingpin commonly provided on trailers, and has neck and shoulder portions of conventional size. A pair of transversely extending plates 13 are welded in edgewise fashion between opposite sides of the shank of pin 12 and the adjacent angle members 9 and 10, one end of each of the plates 13 being secured to pin 12 and the other ends being secured to the respective angle members 9 and 10. A transversely extending plate 14, aligned with plates 13, is welded in edgewise fashion between angle member 10 and sidewall 5; a similar transversely extending plate 15 is welded between angle member 9 and sidewall 4. Plates 13, 14, and 15 are also welded at locations on their upper edges to the lower face of top wall 2.

Additional bracing for pin 12 is provided by a plate 16 welded in edgewise fashion at one end to the shank of pin 12, at a location 90° around this pin from plates 13; plate 16 extends from pin 12 toward the front of device 1 and the upper edge of this plate is secured to the lower face of top wall 2. Plate 16 is provided with a stiffening flange 17 (see FIG. 12) in the form of a flat bar whose upper surface is welded to the lower edge of plate 16 and whose inner end is welded to the shank of pin 12. At its front end, the combination of plates 16 and 17 is formed with a beveled lower surface similar in configuration to that provided on the front end of members 9 and 10. Similarly, a plate 18 is welded in edgewise fashion at one end to the shank of pin 12, at a location 180° around from plate 16; plate 18 extends from pin 12 toward the rear of device 1 and the upper edge of this plate is secured to the lower face of top wall 2. A flat bar 19, similar to bar 17, serves as a stiffening flange for plate 18. The upper surface of bar 19 is welded to the lower edge of plate 18, and the inner end of this bar is welded to the shank of pin 12.

Figures 1, 12:
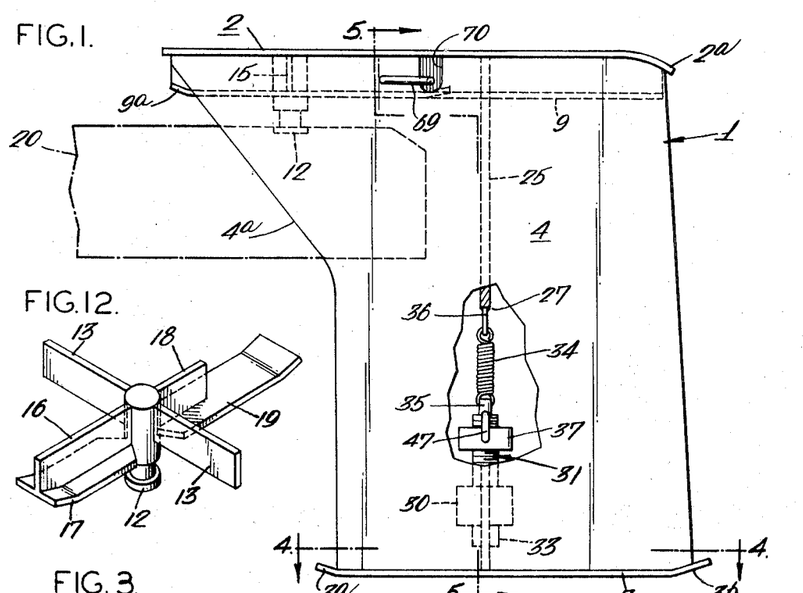
FIG. 1 is a side elevation of a trailer support device according to this invention.
FIG. 12 is a fragmentary perspective view illustrating the support device kingpin and its associated bracing structure.

As previously stated, the kingpin 12 serves as a device-transporting pin member, by means of which the support device 1 (as well as a trailer which may be coupled to the support device, in a manner which will be described) may be secured to a movement means. This movement means, which may also be termed a loading and unloading device, may comprise a tractor such as that known in the art as an "Ottawa Yard Hustler." Such a tractor is quite similar to a common "over-the-road" tractor in general use for hauling trailers, except that the "Ottawa Yard Hustler" has a "fifth wheel" arranged to be hydraulically raised and lowered, whereas the "fifth wheel" of the conventional "over-the-road" tractor is incapable of vertical movement. For use with the support device of this invention, the ordinary "Ottawa Yard Hustler" must be slightly modified by relocating the "fifth wheel" to a location some 6 inches behind the rear axle of the "Hustler." The position of the tractor frame, when the "fifth wheel" of the tractor is coupled to the kingpin 12 of device 1 for moving the same, is indicated in FIG. 1 by the phantom lines denoted by numeral 20. The front or forward edges of both sidewalls 4 and 5 are cut back or toward the rear, as indicated at 4a in FIG. 1, to clear certain fixed parts of the tractor, such as the rear axle and the airbrake shaft. In this connection, it is noted that FIG. 1 is drawn approximately to scale.

When the support device 1 is to be coupled to the tractor "fifth wheel," the tractor is backed up to the front side of device 1, the tractor frame (which overhangs the rear axle of the tractor) then entering the space between the device sidewalls 4 and 5, below the members 9, 10, 17, and 19, with the rear wheels of the tractor to the outside of device sidewalls 4 and 5, such that these sidewalls are located, on each side, between the tractor rear wheels and the tractor frame. The tractor "fifth wheel" is then coupled to the device kingpin 12, for releasably securing the device 1 to the tractor.

Figure 4:
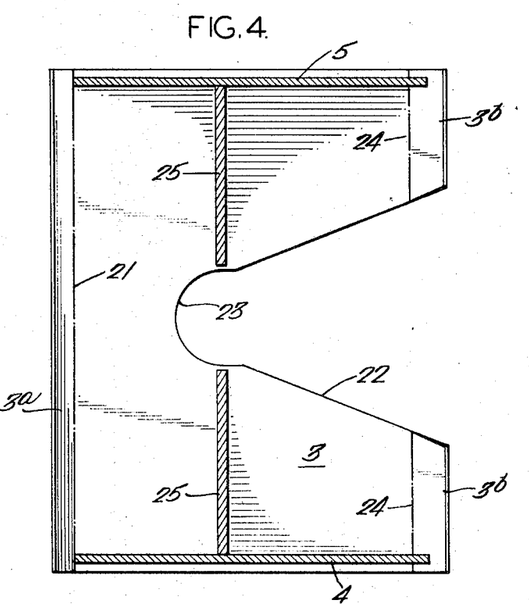
FIG. 4 is a horizontal section taken along line 4—4 of FIG. 1.

A small portion of bottom wall 3 near the front edge thereof is bent upwardly at a small angle as at 3a, to obviate any tendency toward "digging in" at this front end, as device 1 is being transported along the ground surface. The bend line at the front of wall 3 is indicated at 21 in FIG. 4, this line extending across the entire width of the bottom wall 3.

An inwardly tapering aperture 22 is provided in bottom wall 3, this aperture extending inwardly from the center of the rear edge of this wall. Aperture 22 is symmetrical with respect to a horizontally extending centerline in FIG. 4, and has at its inner end an arcuate configuration 23 adapted to removably accommodate an upstanding fixed abutment member (a securing casting, to be later referred to) secured to a trailer supporting surface, e.g. the deck of a ship. The center of curvature of arcuate portion 23 of aperture 22 and the center of curvature of second opening 8 are located in a common vertical transverse plane; the center of curvature of arcuate portion 23 of aperture 22, the center of curvature of second opening 8, and the longitudinal axis of pin 12 all lie in a common substantially vertical longitudinal plane.

A small portion of bottom wall 3 near the rear edge thereof is bent upwardly at a small angle as at 3b. The bend line at the rear of wall 3 is indicated at 24 in FIG. 4, this line extending across the entire width of the bottom wall 3, less of course the portion thereof cut out by aperture 22.

Centered in the transverse vertical plane which contains the center of curvature of the inner end of opening 8 and the center of curvature of arcuate portion 23 of aperture 22 is located a transversely extending spud mounting plate 25 which is secured at its sides to the inner faces of the respective sidewalls 4 and 5, at its upper end to the lower face of top wall 2, and at its lower end to the upper face of bottom wall 3. The upper end of plate 25 is provided with a cutout or aperture 26, which is of substantially rectangular shape (see FIG. 5). Aperture 26 has a width corresponding to the distance between the outer faces of the webs of angle members 9 and 10 (since these latter members extend continuously from the front to the rear of device 1), and a height such as to permit the mounting of a trailer kingpin locking means (to be later described) on the lower face of top wall 2, in the region of opening 8.

Plate 25 has therein a lower cutout or aperture 27, which is also of substantially rectangular shape. The central region of the lower edge of aperture 27 is slotted all the way down to the lower end of plate 25, the slot so provided (whose upper end opens into aperture 27) having an upper straight-sided portion 28 and a lower diverging-sided portion 29 (whose sides make an angle of about 40° with the vertical, the sides 28 being vertical). The lower ends of the sides 29 are aligned with respective opposite sides of arcuate aperture 23 in plate 3. The outer surface of a cylindrical bushing 30 is welded into the upper straight-sided portion 28 of the slot just described.

Figure 5:
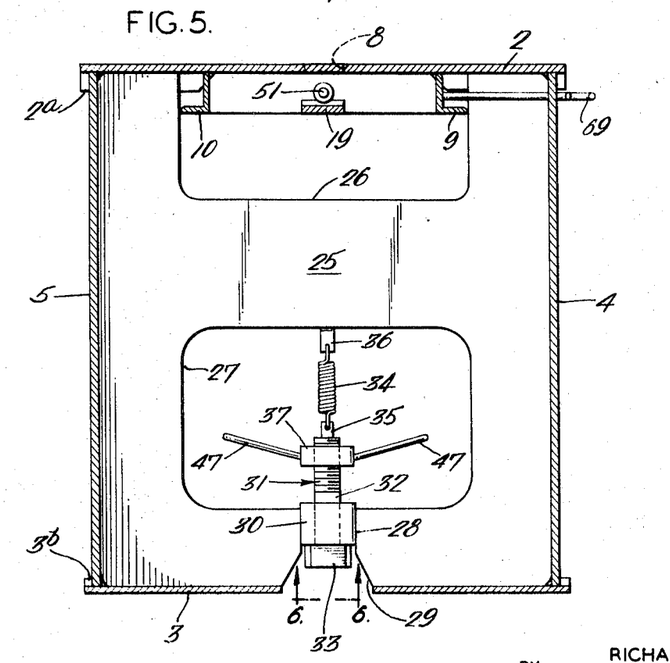
FIG. 5 is a vertical section taken along line 5—5 of FIG. 1.
Figure 6:
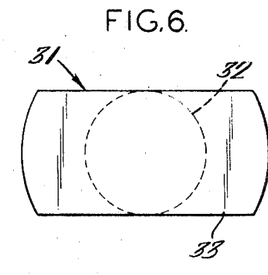
FIG. 6 is a bottom view of the locking spud member, looking in the direction 6—6 in FIG. 5 and drawn on an enlarged scale.

The shank 32 of a locking spud member 31 passes through the bore of bushing 30. At its lower end, spud 31 has an integral enlarged head 33 which is of substantially rectangular configuration but with arcuate ends, as illustrated in FIG. 6. The lower end of a tension spring 34 passes through an aperture provided in a short piece of flat bar stock 35 which is welded at its lower end to the upper end of shank 32, and the upper end of spring 34 passes through an aperture provided in a short piece of flat bar stock 36 whose upper end is welded to plate 25, at the upper edge of aperture 27. In the inoperative or released (withdrawn) position of spud 31 which is illustrated in FIG. 5, spring 34 pulls spud 31 upwardly and keeps the upper surface of its head 33 in engagement with the lower end of bushing 30.

A portion of the upper end of shank 32 is externally threaded, and an internally threaded member 37, to which radially outwardly extending bars 47 are fastened to constitute in effect the wing members of a wing nut, is threaded onto shank 32. When spud 31 is in its operative or locked (extended) position, the lower face of member 37 is adapted to bear against the upper end of bushing 30.

In a practical embodiment of this invention, it is contemplated that about 250 trailers may be loaded onto a "roll-on, roll-off" ship, which will then constitute the carrying means or bulk transport to which reference was previously made. The trailers are loaded onto the several decks of the ship, which may be three in number, and the front end of each trailer is supported by a separate respective one of the support devices 1 during the voyage, after the tractor has been used to load the support-trailer combination onto the ship and has been thereafter uncoupled from this combination. It has previously been explained how the tractor is coupled to the support device 1 for loading and unloading of the support-trailer combination, and it will be explained hereinafter how the support 1 is coupled to the trailer.

At each trailer location on the ship, a fixed abutment member (a securing casting, which will now be described with reference to FIGS. 7–9 and 13) is welded to the ship's deck. The locking spud 31, carried by support device 1, is adapted to cooperate with a respective securing casting, to secure the support device (and hence a trailer, fastened to the respective support device) in position on he deck.

Figures 7, 8, 9, 13:
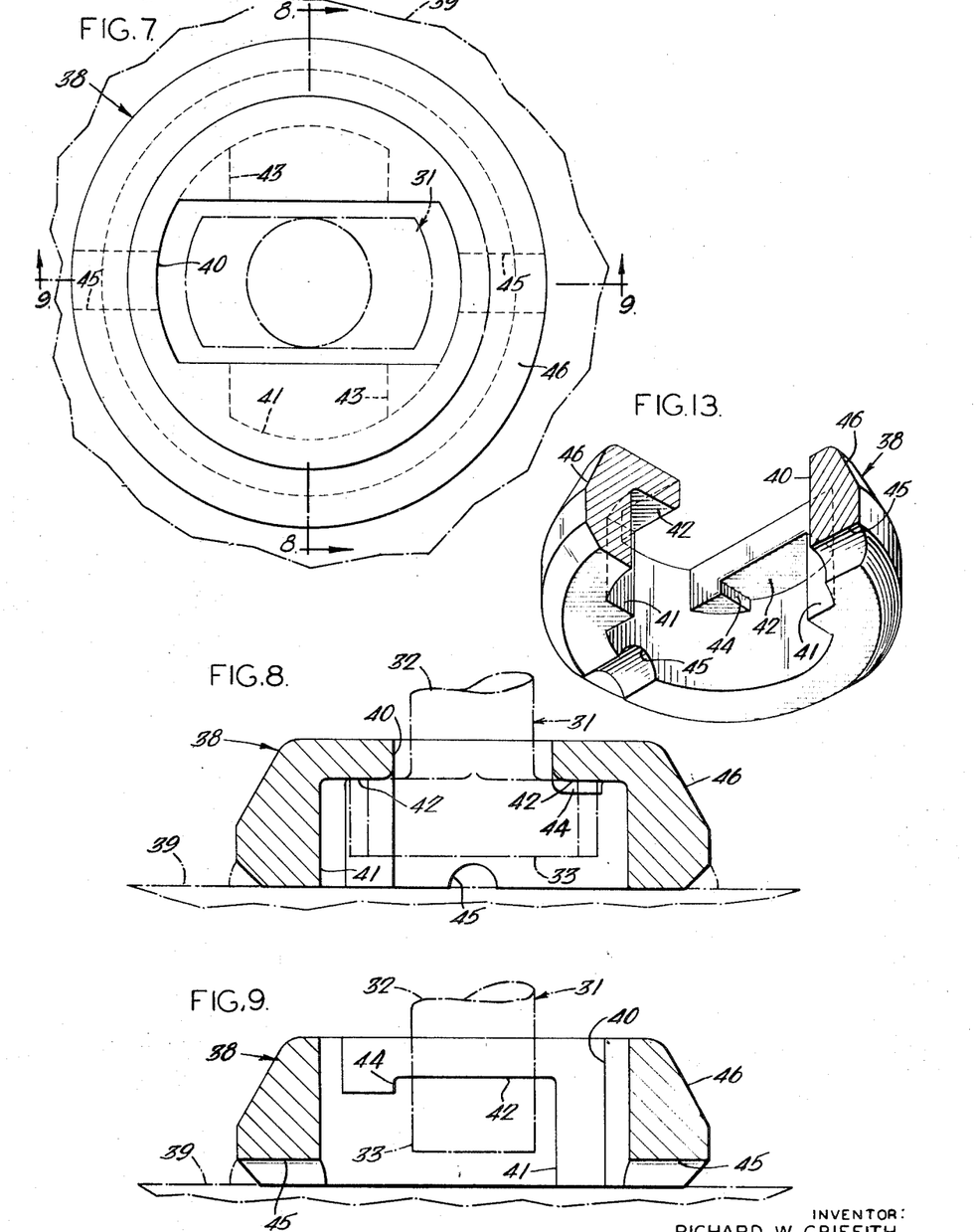
FIG. 7 is a top or plan view of a deck-securing casting.
FIG. 8 is a sectional view taken on line 8—8 of FIG. 7.
FIG. 9 is a sectional view taken on line 9—9 of FIG. 7.
FIG. 13 is a perspective view (partially broken away) of a deck-securing casting, looking at the underside thereof.

A casting or "button," denoted generally by numeral 38, is of circular outer configuration and is welded around its base to the upper surface of deck 39, which is indicated in phantom in FIGS. 7–9. The "button" is thus arranged to be upstanding or to project upwardly from the deck surface, the maximum height of the casting being about 2⅝ inches. As previously stated, these "buttons" are arranged upon the decks of the ship, one "button" in the preplanned position for the front end of each respective trailer to be carried by the ship.

The casting 38 has two openings 40 and 41 formed therein, each of these openings having a generally rectangular shape (but with arcuate ends) when seen in plan (similar to the shape of locking spud head 33; see FIG. 6), and each being a little wider and a little longer than the locking spud head, so as to allow ready entry of this head thereinto. The openings 40 and 41 are arranged with their longer dimensions at 90° to each other.

The upper opening 40 is a slot which extends entirely through the casting, from top to bottom thereof. This slot is centrally located with respect to the outer circular periphery of the casting.

The lower opening 41 is a recess which opens into the lower face of the casting 38 and extends upwardly therefrom, but terminates below the upper face of the casting. In this connection it is noted that, since the opening 40 lies in effect immediately above the opening 41, and since both of these openings are centered on the center of the circular outer configuration of "button" 38, the square central portion of the lower opening 41 (which portion is common to both this lower opening and to slot 40) of course extends throughout the height of the casting, from top to bottom thereof. Since the two opposite end areas of recess 41 do not extend throughout the height of the casting, but terminate a little distance (say three-fourths inch) below the upper face of the casting, at these end areas the top wall of the recess provides downwardly facing fixed abutments 42 (see FIG. 8).

At each of two diametrically opposite ones of the four corners which are delineated by adjacent (and perpendicular) sides of openings 40 and 41, there is a respective somewhat segmental-shaped extension 43 of the recess 41, each of these two extensions being defined by one side of opening 40, one side of opening 41, and a portion of the circumference of the circle of which the arcuate ends of openings 40 and 41 are other portions of the circumference. The two diametrically opposite corners at which these recess extensions 43 are located are at the upper left and the lower right in FIG. 7. Of course, since the opening 40 extends throughout the entire height of the casting 38, the sides of the extensions 43 defined by this opening do likewise. However, the sides of extensions 43 defined by opening 41 extend upwardly from the bottom of the casting 38, as does opening 41, these sides terminating somewhat below the horizontal plane in which lie the fixed abutments 42; for example, these latter sides of extensions 43 may terminate a distance of 1 inch below the upper face of the casting, thus providing a short one-fourth inch in height) vertically extending abutment 44 near each of the two respective ends of opening 41, at respective opposite sides thereof. The purpose of these abutments will be described hereinafter.

The two remaining ones of the four four corners referred to in the preceding paragraph (to wit, the upper right and lower left corners in FIG. 7) are not cut away, thereby leaving vertically extending solid walls (which extend for the full height of opening 41) near the respective opposite ends of opening 41, at respective opposite sides thereof. These last-mentioned solid walls serve as limiting stops, as will be described.

For drainage purposes, two diametrically opposite arcuate (semicircular) recesses 45 are cut into the lower face of casting 38, each of these recesses extending from the outer substantially cylindrical sidewall of the casting into communication with the slot 40 (which, as previously stated, extends throughout the entire height of the casting).

The maximum O.D. of casting 38 is in its bottom region, and this maximum O.D. is such that the bottom portion of the casting can readily enter into the arcuate front end portion 23 of aperture 22 in the bottom wall 3. Above this maximum O.D. cylindrical bottom portion (which may be about 1 inch in height), the casting has a frustoconical outer sidewall 46 which extends to the upper face of the casting. This frustoconical sidewall makes an angle of 30° with the vertical, such as to easily fit within the 40° taper of the diverging-sided portion 29 of the slot in plate 25, below the lower end of bushing 30.

When a tractor has been coupled to support device 1 (by means of kingpin 12, in the manner previously described), and the support device is thereafter coupled to a loaded trailer (in a manner to be described), the support device-trailer combination may be hauled by the tractor onto the deck of a ship, to a position adjacent an appropriate one of the "buttons" 38, and specifically to a position wherein the rear end of the device 1 is just forward of the "button" and is laterally aligned therewith. Then, the device 1 (with its associated trailer) is moved backward by the tractor so that "button" 38 can enter the aperture 22, it being assumed that the device bottom wall 3 is positioned sufficiently close to the ship's deck so that this can occur. If the device 1 is not quite centered with respect to the "button" 38, the "button" comes into contact with one or the other of the vertical sidewalls forming aperture 22, and as the device 1 continues to move rearwardly, the inward taper of aperture 22 causes the device 1 to move bodily to one side of the other to bring the forward end 23 of aperture 22 into registry with the "button," so that the "button" 38 enters this arcuate forward end of aperture 22.

When the arcuate forward end 23 of aperture 22 comes into engagement with the outer wall of casting 38, the tractor is stopped and the "fifth wheel" of the tractor lowered until the device 1 contacts the deck.

Now, the spud 32 is manually pushed downwardly, against the bias of spring 34, so that the spud head 33 enters into the casting slot 40, from the upper end thereof. This position of the spud is shown in phantom in FIG. 7. The spud 32 is pushed downwardly in slot 40 until the upper face of its head 33 clears the lower end of the vertical abutments 44, and then it is rotated (in the clockwise direction in FIG. 7) to cause the spud head to enter the lower or cross-recess 41, the spud head being rotated through 90° or until its opposite sidewalls come into contact with one or both of the two vertically extending solid walls located one near each end of the recess 41 and at respective opposite sides of this recess (this rotation to engagement with the limiting stops assuring that the spud head is properly seated in cross-recess 41).

Nut 37, threaded on the shank 32 of spud 31, moves downwardly along with spud 32, of course, when the latter is pushed bodily downward as above described. When spud head 33 is properly seated in recess 41, the lower end of nut 37 will be spaced slightly above the upper end of bushing 30. Nut 37 is then turned downwardly into engagement with the upper end of bushing 30 by suitable manipulation of bars 47, and as this nut is tightened it bears against rigid bushing 30, which causes the upper face of spud head 33 (at its two opposite ends) to be drawn upward into tight engagement with the downwardly facing fixed abutments 42 in the casting 38. This results in the securing of the support device 1 (and the trailer coupled thereto) firmly to casting 38, and thus also to the deck 39.

Figure 10:
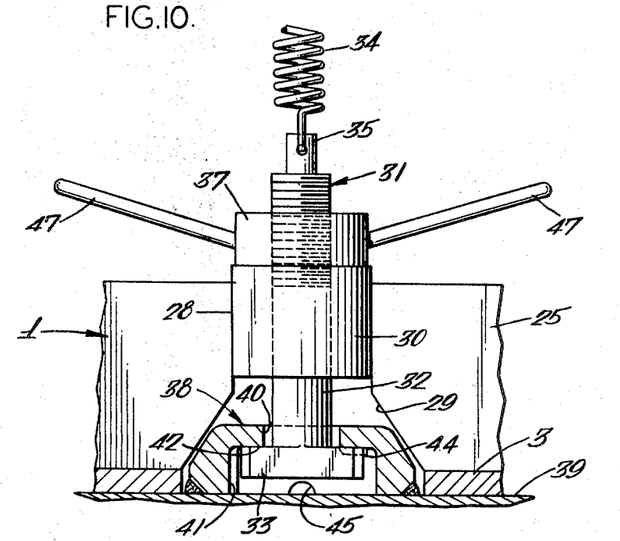
FIG. 10 is a partial sectional view generally similar to FIG. 5, but showing the locking spud in locking position in a securing casting.

In FIG. 8, and also in FIG. 9, the operative or locked position of the locking spud 31 in the casting 38 is illustrated by the phantom lines 33 and 32, denoting the spud head and shank, respectively, In FIG. 10, the spud 31 is illustrated in its locked position in casting 38. Note that the spring 34 is extended as compared to FIG. 5, nut 37 is in contact with the upper end of bushing 30, and the upper face of the spud head 33 is in contact with the downwardly facing abutments 42 of the casting.

The vertical abutments 44 provided near opposite ends of opening 41 provide a factor of safety. If the nut 37 loosens slightly for some reason, the sides of the spud head 33 will move into contact with these vertical abutments and will be prevented thereby from rotating out of opening 41.

Figure 2:
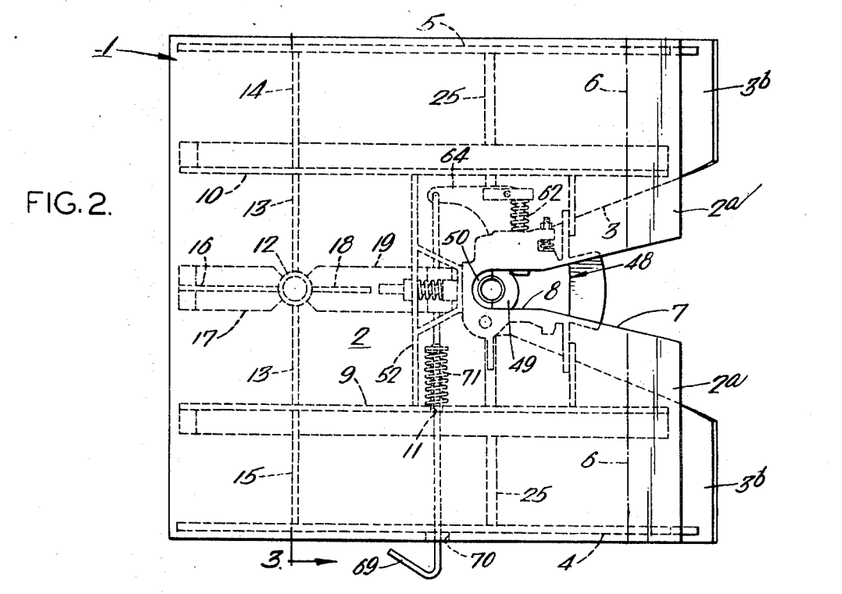
FIG. 2 is a top or plan view of the support device, the trailer-locking means or hitch or "fifth wheel" being shown in its locked position.
Figure 3:
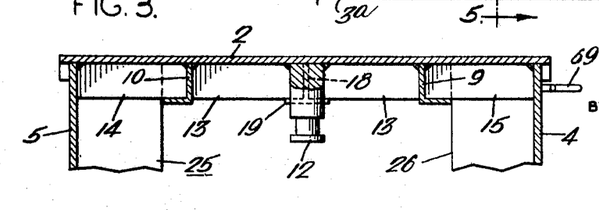
FIG. 3 is a partial vertical section taken along line 3—3 in FIG. 2.
Figure 11:
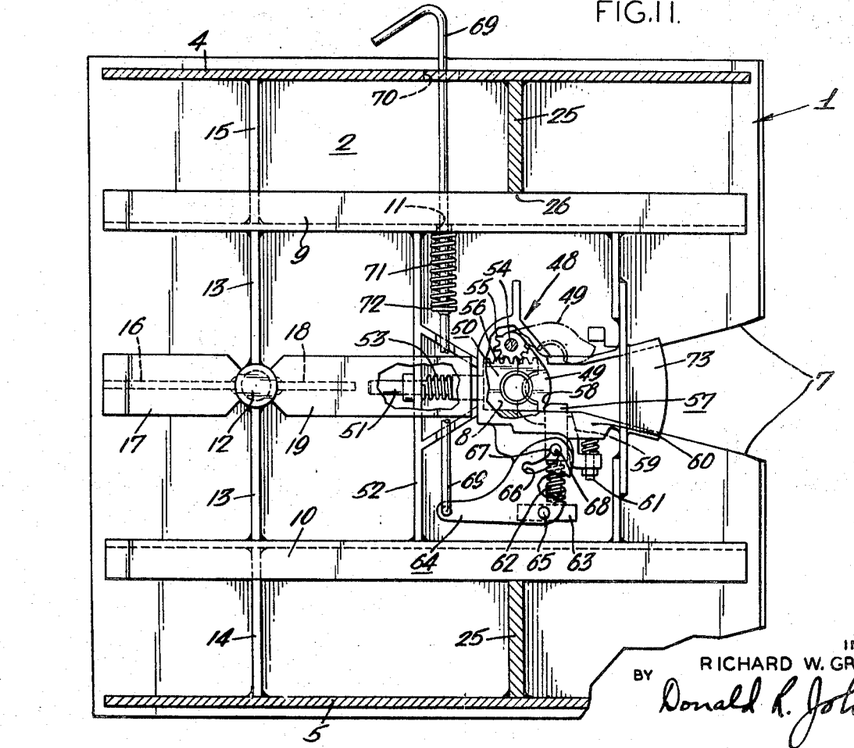
FIG. 11 is a view looking at the underside of the top plate of the trailer support device, partially broken away to show details of the trailer-locking means or "fifth wheel"

The "fifth wheel" structure provided on the support device 1, for coupling the said device to the kingpin of a trailer, will now be described. This structure is quite similar to that disclosed in U.S. Pat. No. 2,610,069, dated Sept. 9, 1952, to which reference may be had for details not otherwise described hereinafter. The "fifth wheel" structure utilized in the present invention includes a releasable locking means for locking the trailer kingpin to the rigid boxlike support device 1. Refer now to FIGS. 2 and 11, and particularly to the latter.

A "fifth wheel" structure, denoted generally by numeral 48, is fixedly secured to the underside of top wall 2 of device 1, in alignment with the openings 7 and 8. Structure 48 is laterally centered on top wall 2 and is aligned front-to-rear with kingpin 12. Structure 48 is a fifth wheel of the type known in the art as a "Holland Hitch." It is illustrated in full lines in the locked position in FIGS. 2 and 11, in which position its locking jaws would ordinarily be locked around the kingpin of a trailer; however, in order to simplify the drawings, the trailer kingpin is not illustrated. When the two locking jaws 49 and 50 of structure 48 are in the locked position referred to, a hollow cylindrical kingpin locking surface is provided which fully encircles the trailer kingpin. The longitudinal axis of this kingpin locking surface extends in a substantially vertical direction, is parallel to the longitudinal axis of kingpin 12, and lies in the same horizontal plane therewith (viewed in FIG. 2). Also, the longitudinal axis of the aforesaid kingpin locking surface lies in the same vertical plane (viewed in FIG. 2) as the vertical midplane of mounting plate 25. Further, the longitudinal axis of the aforesaid kingpin locking surface is located approximately at the center of curvature of the arcuate inner surface of opening 8. The opening 26 in plate 25 accommodates the structure 48. See FIG. 5.

The forward locking jaw 50 is secured to a pin 51 which is mounted for fore-and-aft sliding movement in a fixed plate 52 which extends between the parallel angle members 9 and 10 and is secured thereto and to the underside of top wall 2. A compression spring 53, one end of which bears against plate 52 and the opposite end of which engages an abutment formed on jaw 50, tends to urge this jaw rearwardly with respect to device 1, that is, toward the unlocked or open position of this jaw. At its rear end, locking jaw 50 has formed thereon a segmental cylindrical wall which, when the jaws 49 and 50 are in the locked position, forms the front portion of the complete or 360° cylindrical kingpin locking surface previously referred to.

The rear or aft locking jaw 49 is rotatably mounted on a fixed vertically extending pivot pin 54 which is located near one end of this jaw, so that jaw 49 can rotate as a cantilever jaw in a substantially horizontal plane, through a certain angle. Jaw 49 is rotatably driven through this angle, in response to the sliding movement of jaw 50, by means of a set of gear teeth 55 formed on jaw 49 near the pivot pin 54 end thereof; gear 55 meshes with and is driven by a racklike gear tooth arrangement 56 formed on jaw 50. The gear-driven jaw 49 can rotate in a counterclockwise direction (viewed in FIG. 11) from the locked position illustrated in full lines to an open position illustrated in phantom lines, wherein it lies entirely outside of opening 8. In this latter or open position, the kingpin of a trailer can enter opening 7, passing therealong into opening 8 and coming into contact with the rear end of jaw 50. For obvious reasons, the jaw 49 may be thought of as a hinged lock, while the jaw 50 may be thought of as a sliding lock. The inner end of locking jaw 49 has formed thereon a segmental cylindrical wall which, when the jaws 49 and 50 are in the locked position, mates with the segmental cylindrical wall on jaw 50 to form the complete or 360° cylindrical kingpin locking surface previously referred to.

A spring-impelled locking plunger 57, having a beveled surface 58 at its forward, inner end, is mounted for sliding movement through a small range (in a direction transverse to the direction of movement of jaw 50) in a guideway provided by a lock adjusting wedge 59 and by a portion of the fixed housing or casting 60 and by the underside of the top plate 2. In the locked position of jaws 49 and 50, the inner end of plunger 57 lies directly in back of, and in firm engagement with, the rear surface of the free end of hinged lock 49. Thus, in this position, the plunger 57 effectively and securely maintains the jaw 49 in its locked position. The lock adjusting wedge 59 is spring-biased and is adjustable with respect to housing 60 by means of a bolt 61, to move plunger 57 in a direction parallel to the direction of sliding movement of jaw 50, thereby to compensate for any wear of the jaws.

One end of a compression spring 62 bears against the outer end of plunger 57 and the other end of this spring bears against a fixed abutment 63 fastened to the underside of top wall 2; spring 62 urges plunger 57 upwardly in FIG. 11.

To provide for manual movement of plunger 57 to its released position, an L-shaped release arm 64 is pivotally mounted on a pin 65 which is secured to abutment 63. Pin 65 is located at the angle of the "L" of arm 64. Arm 64 has formed therein (at one end of the "L" of this arm) a camming slot with two dwell portions 66 and 67 at its ends, dwell portion 66 being closer to the center of pin 65 than is dwell portion 67. A capscrew 68, secured to plunger 57, carries a roller (not shown) which rides in the camming slot of arm 64. The inner end of a releasing handle 69 is pivotally secured to the other end of the "L" of arm 64, and this handle extends laterally outwardly through aperture 11 in angle member 9 (see FIG. 2) and on through a suitable aperture 70 (see FIG. 1) provided in the upper end of sidewall 4, to a point outside device 1. The outer end of handle 69 is bent as illustrated, to provide a convenient means for grasping the same. The inner end of a compression spring 71 (which surrounds handle 69) bears against a washer 72 which is secured to handle 69, while the outer end of this spring bears against the web of angle member 9.

The operation of the "fifth wheel" structure 48 will now be described. The jaws 49 and 50 are illustrated in full lines in FIG. 11 in the locked position, and it is assumed that we now desire to unlock the "fifth wheel" structure 48, and also the support device 1, from a trailer. Handle 69 is pulled outwardly or vertically upwardly in FIG. 11, compressing spring 71, which then tends to return the releasing handle to its original or inward position. The movement of handle 69 upwardly rotates the release arm 64 in the clockwise direction (viewed in FIG. 11) about its pivot 65, moving the cam portion 67 away from screw 68 and its roller, and bringing the cam portion 66 to this area so that the roller on screw 68 can enter into this latter cam portion. This provides a camming action which pulls plunger 57 downwardly in FIG. 11. Arm 64 will tend to remain in this latter position, because of the force of spring 62 urging plunger 57 (and its screw 68 and roller) upwardly in FIG. 11. This movement of plunger 57 downwardly removes it sufficiently from its locking position (with respect to pivoted jaw 49) so that the trailer kingpin can be pulled out of the cylindrical kingpin locking surface provided by jaws 49 and 50.

When the trailer kingpin is pulled out of the aforementioned cylindrical kingpin locking surface (by forward movement of the tractor and device 1 with respect to the trailer), jaw 49 is rotated about its pivot 54 in the counterclockwise direction (as viewed in FIG. 11). As jaw 49 rotates in this manner, its free end contacts the beveled end 58 of plunger 57, moving this plunger downwardly far enough to push the roller on screw 68 out of the cam dwell portion 66 of arm 64. This allows spring 71 (which is still under compression) to rotate arm 64 in the counterclockwise direction (viewed in FIG. 11) back to its original position, this action being caused to take place as a result of spring 71 pushing handle 69 back down. It may be here noted that the rotation of pivoted jaw 49 in the counterclockwise direction, as just described, is assisted by the action of spring 53, which urges sliding jaw 50 toward the rear of device 1 (i.e., to the right in FIG. 11), the motion of this sliding jaw (through the gear arrangement 55–56) rotating the pivoted jaw 49 in the counterclockwise direction.

As a result of the above-described action, the "fifth wheel" structure 48 is brought to its released (or open) position, ready to be coupled to another trailer; in this open position shown in phantom in FIG. 11, sliding jaw 50 is in a position somewhat to the right of that illustrated in full lines in FIG. 11 (i.e., it is closer to the rear of device 1), and pivoted jaw 49 lies entirely outside of opening 8 (i.e., above this opening in FIG. 11).

A reinforcing or bracing plate 73, integral with the casting or housing 60, spans the opening 7. Plate 73 is arched at its side edges, where it joins the casting 60, in such a direction that the portion of this plate which spans opening 7 lies a considerable distance below the underside of top wall 2; this said distance is sufficient to be below the lower end of a trailer kingpin entering opening 7 and moving toward opening 8. Thus, plate 73 does not interfere with the coupling of trailers to the support device 1, or with the uncoupling of trailers therefrom.

When it is desired to couple a trailer to the support device 1, device 1 is moved by the tractor rearwardly with respect to the stationary trailer, so that the trailer kingpin in effect moves forwardly into opening 7 and thence into opening 8 (this would be toward the left as view in FIG. 11). The trailer kingpin travels over plate 73 through opening 7 into opening 8, where it eventually comes into contact with the spring-tensioned sliding lock 50 and then pushes this lock forwardly (toward the left in FIG. 11). As jaw 50 moves toward the left, it (through the gear arrangement 55–56) swings the pivoted or hinged jaw 49 in the clockwise direction (viewed in FIG. 11) into its locking position illustrated in full lines, wherein it and jaw 50 form the above-mentioned cylindrical kingpin locking surface. The pivoted jaw or hinged lock 49 has a rounded camming surface at its outer end which pushes locking plunger 57 downwardly (against the bias of its spring 62), so that jaw 49 can swing into its locking position, and then, when the lower end of jaw 49 has cleared the plunger, spring 62 pushes plunger 57 back upwardly, into its locking position under jaw 49. That is to say, when full encirclement of the trailer kingpin is made by the 360° closing of the jaws 49 and 50 on both neck and shoulder of the kingpin, the spring-impelled plunger 57 goes into its locking position illustrated in full lines in FIG. 11. During this coupling and locking operation, the release arm 64 and the releasing handle 69 remain essentially stationary.

From the foregoing, it may be seen that the coupling and locking of the support device 1 to a trailer (by means of the fifth wheel structure 48) is done automatically; the release of this coupling is made manually (upon manual actuation of the releasing handle 69).

An overall description of the operation of the invention will now be given.

In connection with the operation to be described, the reader is cautioned to note that the series of method steps set forth herein may be varied without departing from the method required to utilize this invention. The sequence of method steps given herein is merely the preferred sequence of steps.

A conventional truck trailer is transported by a conventional or "over-the-road" tractor attached to the trailer kingpin with the wheels of the trailer landing gear in "up" position. The trailer is then placed in the marshalling yard adjacent the carrying vehicle (ship), following which the landing gear is lowered and the conventional tractor uncoupled and removed.

If it is necessary to raise the forward end of the trailer prior to utilization of the support device 1, this may be done by coupling the "Ottawa Yard Hustler" 20 to the trailer kingpin, then elevating the "fifth wheel" of the "Hustler" to raise the forward end of the trailer, and then placing the landing gear on an elevated surface (elevated with respect to the roadway) which has been constructed in the marshalling yard for the landing gear.

Thereafter, the "fifth wheel" of the "Hustler" is disengaged from the trailer kingpin and the "Hustler" is moved away from the trailer.

Support device 1 is now utilized. The "Hustler" (tractor) is placed in a position wherein its "fifth wheel" is in lateral alignment with kingpin 12. The tractor is then backed into support device 1 until the pin 12 of device 1 enters the recess provided in the "fifth wheel" of the tractor. The kingpin locking means of the tractor is then actuated, to lock the support device to the tractor.

It is noted that in this position the tractor frame 20 is disposed within support device 1, as illustrated in FIG. 1.

The elevatable fifth wheel of the "Hustler" tractor is now raised, if necessary, to place openings 7 and 8 of the support device 1 in proper vertical alignment with the kingpin of the truck trailer. Assuming that the fifth wheel structure 48 is in its released or open position (it will ordinarily be in this position when not coupled to a trailer), the tractor, now carrying support device 1, is moved rearwardly with respect to the trailer, so that the trailer kingpin first enters opening 7 and then moves into opening 8. Further rearward movement of the device 1 by the tractor causes the trailer kingpin to engage the sliding lock 50, whereupon automatic coupling and locking of the device 1 to the trailer takes place, in the manner previously described.

The support device-trailer combination is then moved by the use of the "Hustler" to the position that it will assume on the carrying vehicle (e.g., ship), this position being such that the support device 1 is just forward of an appropriate one of the "buttons" 38 and is laterally aligned therewith. The combination is then moved backward, with the device bottom wall 3 located rather close to the deck, until the "button" enters the forward end 23 of aperture 22. At this point, the opening 40 in deck casting 38 will be aligned with spud 31. The spud head 33 is then pushed downwardly sufficiently far into slot 40 and rotated 90° clockwise to bring it into registry with lower opening 41 in the casting, following which nut 37 is rotated to tighten the spud head in position and thus to firmly secure the support device 1 to deck casting 38. Of course, the elevatable "fifth wheel" of the tractor should be moved downwardly until support device 1 contacts the floor or deck of the carrying vehicle, before the spud 31 is moved from its rest, withdrawn, or inoperative position. At this point, the pin-locking mechanism on the tractor is released and the tractor removed from the support device-trailer combination.

After the carrying vehicle has completed its voyage, the nut 37 is loosened sufficiently to permit a 90° counterclockwise manual rotation of the spud head (so that such head comes into registry with the slot 40), the spud then being released to allow spring 34 to withdraw the spud upwardly out of the deck casting 38. The elevatable "fifth wheel" of the tractor is brought into interlocking relationship with pin 12 of support device 1. The kingpin locking mechanism of the tractor is then engaged, and the elevatable "fifth wheel" of the tractor raised so that the support device 1 is lifted off the deck. The support device-trailer combination is then removed from the carrying vehicle to the marshalling yard, where the wheels of the trailer landing gear are placed on an elevated surface which is high enough to allow the support device to be released from the trailer with no interference with the ground.

Releasing handle 69 is then (manually) pulled outwardly, away from the support device 1, to pull the locking plunger 57 of structure 48 to its releasing position, wherein the trailer kingpin can be pulled out of the cylindrical kingpin locking surface provided by jaws 49 and 50. The tractor then removes support device 1 from the trailer by moving the support device forwardly with respect to the trailer.

By raising the landing gear, thereby lowering the forward end of the trailer to the desired height, a conventional tractor can be secured to the trailer kingpin; then the wheels of the trailer landing gear are cranked into "up" position and the tractor moves the trailer to its ultimate destination.

I claim:

1. In combination, a support device for trailers comprising a rigid boxlike structure having a top wall, a bottom wall substantially parallel thereto, and a pair of spaced, parallel upstanding sidewalls interconnecting said top and bottom walls; said top wall having therein, extending inwardly from one edge thereof, an inwardly tapering first opening and having also a second opening abutting said first opening, said second opening having at its inner end an arcuate configuration adapted to receive the kingpin of a trailer; locking means mounted in registry with said second opening for releasably securing a trailer kingpin in position at the inner end of said second opening, and a device transporting pin member downwardly depending from the lower face of said top wall opposite said second opening and spaced therefrom, said bottom wall having therein, extending inwardly from one edge thereof, an inwardly tapering aperture having at its inner end an arcuate configuration; an upstanding fixed abutment member of circular configuration secured to a trailer supporting surface, said abutment member being receivable in the inner end of said aperture; and a latching member carried by said device and engageable with said abutment member for securing said device in position on said supporting surface.

2. Combination of claim 1, wherein said abutment member provides a downwardly facing latching abutment, and wherein said latching member comprises a spud whose head is engageable with said latching abutment.